United States Patent [19]

Swanson

[11] Patent Number: 4,502,661

[45] Date of Patent: Mar. 5, 1985

[54] ELECTRICALLY ACTUATED VALVE ASSEMBLY

[75] Inventor: Wesley S. Swanson, Elkgrove Village, Ill.

[73] Assignee: Eaton Corporation, Cleveland, Ohio

[21] Appl. No.: 548,800

[22] Filed: Nov. 4, 1983

[51] Int. Cl.³ .............................................. F16K 31/40
[52] U.S. Cl. ....................................... 251/30; 251/38; 251/45
[58] Field of Search ................... 251/45, 46, 30, 141, 251/129

[56] References Cited

U.S. PATENT DOCUMENTS

| | | | |
|---|---|---|---|
| 2,964,286 | 12/1960 | Hoskins | 251/30 |
| 3,630,482 | 12/1971 | Beller | 251/129 |
| 3,712,581 | 1/1973 | Parlow | 251/129 |
| 3,943,975 | 3/1976 | Schnittker | 251/30 |
| 3,994,318 | 11/1976 | Ishigaki | 251/30 |
| 4,025,887 | 5/1977 | Romans | 335/278 |
| 4,161,306 | 7/1979 | Brune et al. | 251/129 |
| 4,222,410 | 9/1980 | Gelmer | 251/38 |
| 4,262,877 | 4/1981 | Lang | 251/129 |
| 4,283,040 | 8/1981 | Kolze | 251/30 |

Primary Examiner—James C. Yeung
Attorney, Agent, or Firm—C. H. Grace; R. A. Johnston

[57] ABSTRACT

A pilot operated solenoid actuated valve assembly having a differential pressure sensing diaphragm for opening the main valve in response to loss of pressure through a pilot flow valve from a control pressure chamber. The pilot valve-armature is housed in a non-magnetic guide which is sealed about the diaphragm to form the control pressure chamber. Tubular pole segments surround the guide and define a magnetic air gap. An auxiliary pole piece is loosely received in the guide and is spring biased away from the armature. The pole piece enables the armature to be held fully open at a substantially reduced level of voltage from the actuation or service voltage.

6 Claims, 4 Drawing Figures

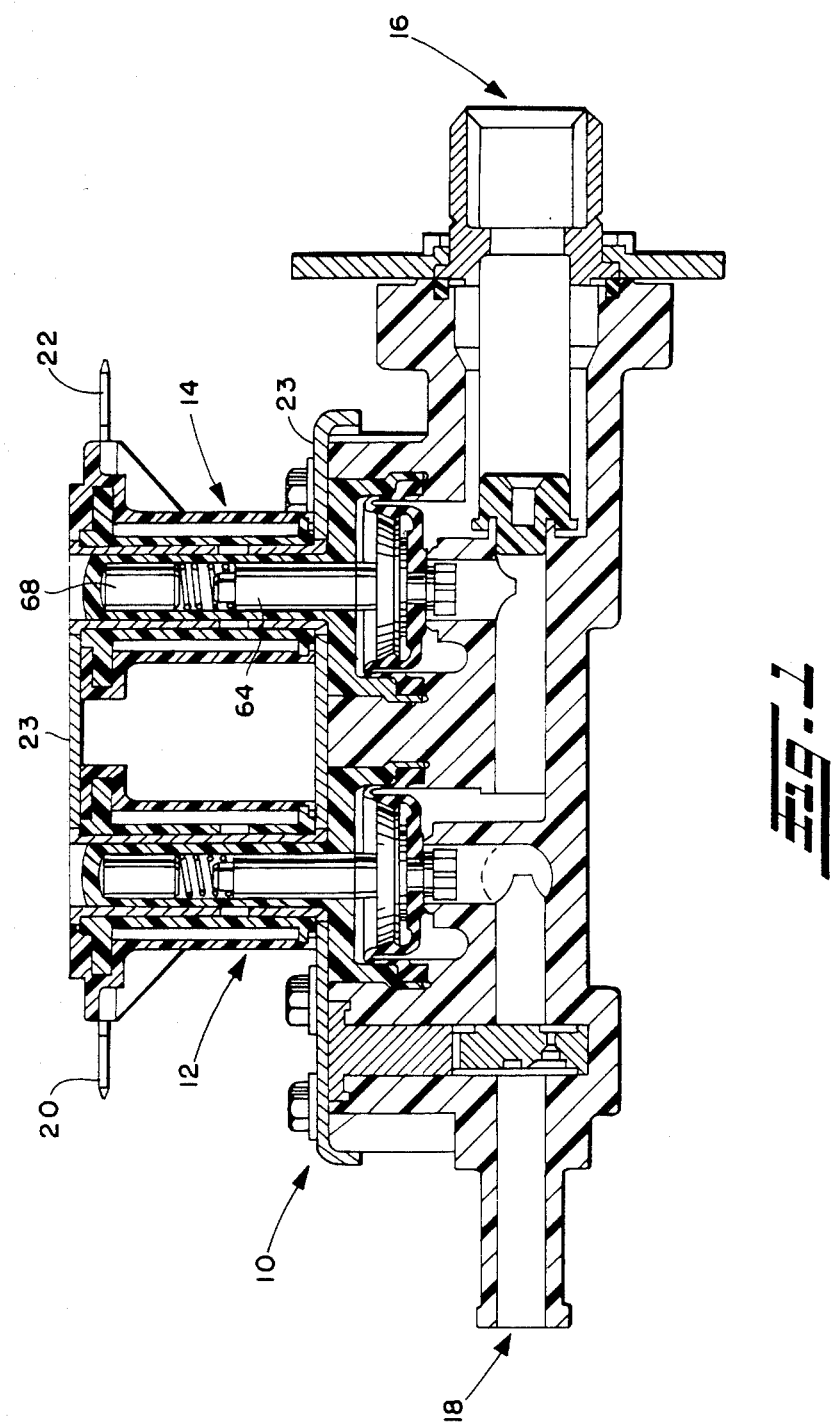

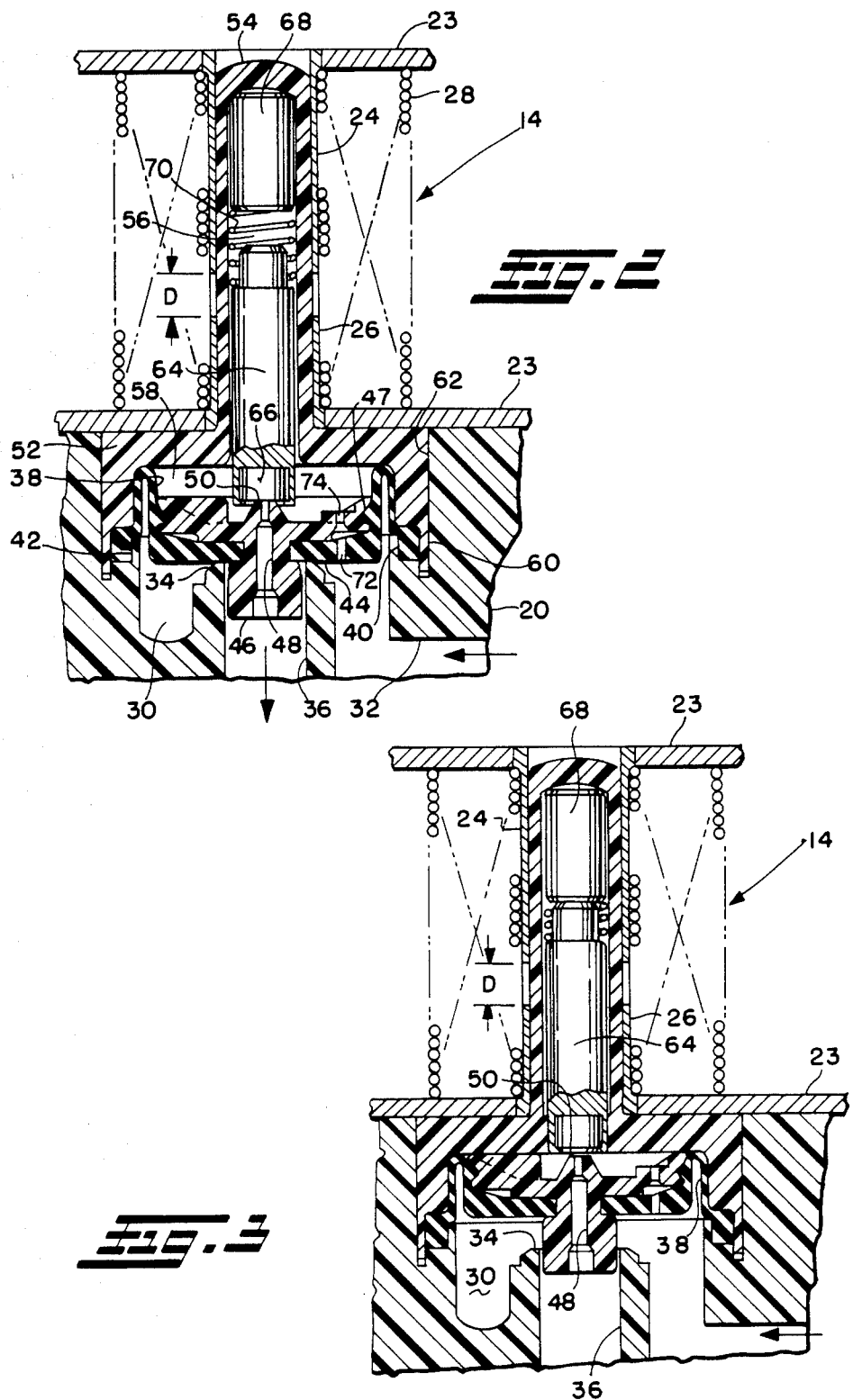

ELECTRICALLY ACTUATED VALVE ASSEMBLY

BACKGROUND OF THE INVENTION

The present invention relates to electrically actuated valves of the type employed for control of water inlet flow to appliances, as for example, domestic dish washers and washing machines. In order to prevent overheating of the electrical actuator, it has been required to energize the water inlet valve with a very minimum of electrical power.

It has, however, been desired to eliminate the electromechanical programmer and to provide electronic control of the appliance program functions utilizing low voltage solid state control devices. Such electronic control requires the water inlet valve to actuate when supplied with a direct current, which may be filtered, fullwave or halfwave rectified voltage in the range 3–120 volts and to consume only about 4 watts of power. The aforesaid low power requirements for an appliance inlet valve are considered quite stringent when compared to the requirements for valve employed in appliances controlled by an electromechanical programmer switching mechanism.

In order to keep the electrical power requirement for appliance inlet valves actuation reduced to a minimum, it has been the practice to employ a solenoid powered armature-pilot valve for initiating actuation of the main inlet valve. Such an arrangement requires only a small magnetomotive force from the solenoid to move the armature for opening the pilot valve. The use of a low opening force pilot operated valve has enabled the power requirements for the solenoid to be minimized; and, thus, this type of valve has been widely used in domestic washing appliance applications. Typically, in such a valve opening the pilot valve permits pilot flow to the outlet from a control pressure chamber thereby creating a pressure differential across a diaphragm connected to the main valve, whereupon the pressure differential opens the main valve.

It has thus been desired to provide an electrically energized pilot operated water inlet valve for applicances capable of operation from a direct current power source having a very low power consumption therefrom.

SUMMARY OF THE INVENTION

The present invention provides an electrically energized pilot operated solenoid valve suitable for very low power direct current voltage controlled systems such as solid state electronic switching for the control of water inlet flow to a domestic washing appliances. The present invention provides a novel solution to the above described problem of providing an electrically operated valve, low in manufacturing cost, and capable of energization by a direct current voltage and low power consumption in the range of about 4 watts for such a low voltage supply.

The present invention employs the well known armature-pilot valve operator which, upon energization of the solenoide, enables a pilot flow for creating a pressure differential across a diaphragm to open the main valve operator. The armature-pilot valve of the present invention is received in a non-magnetic armature guide which is sealed about the periphery of the diaphragm to provide a control pressure chamber from which pilot flow is initiated for creating the differential pressure which opens the main valve.

The non-magnetic armature guide has received thereover axially spaced ferromagnetic tubular pole pieces which define magnetically opposite poles having an air gap disposed therebetween. The armature is received in the guide having a pilot valve on one end with the other end disposed adjacent the air gap formed by the tubular pole pieces. An auxiliary stationary ferromagnetic pole piece is received in the armature guide and is biased against the closed end thereof by one end of a spring the other end of which urges the armature-pilot in the opposite direction to close the pilot flow valve.

The unique solenoid construction of the present invention thus employs an auxiliary stationary pole piece disposed within the armature guide, and thus within the control pressure chamber, for concentrating magnetic flux to increase the magnetomotive force acting on the armature for moving the armature to the fully opened position contacting the auxiliary pole piece and for preventing oscillation. The auxiliary pole piece is disposed remote from the magnetic pole air gap so as not to interfere with the attractions of the armature to the gap between the poles.

The unique solenoid constructions of the present valve enables the magnetic pole segments in the form of the axially spaced tubular coil cores to be arranged so as to permit a shorter axial air gap between the poles than would be required for a construction not employing the arrangement of the present invention.

The unique valve construction of the present invention permits a solenoid energized valve to be operated on a D.C. power supply, filtered or unfiltered and draws a minimum of current therefrom for controlling inlet flow to an appliance. The unique valve construction of the present invention employs an auxiliary ferromagnetic pole piece disposed in the control pressure chamber for the pilot valve to provide a concentration of magnetic flux for holding the pilot armature in a fully open position and preventing oscillation. The unique valve construction of the present invention enables the electrically energized pilot operated valve to remain in the fully open position with a reduced voltage applied to the valve after it has moved to the fully open position.

BRIEF DESCRIPTION OF THE DRAWINGS

FIG. 1 is a cross section of a dual coil appliance inlet mixing valve employing the present invention;

FIG. 2 is an enlarged view of one coil of the valve of FIG. 1 shown in the energized valve closed condition; and, FIG. 3 is a view similar to FIG. 2 illustrating the valve in the coil energized open condition.

DETAILED DESCRIPTION

Figure 4:
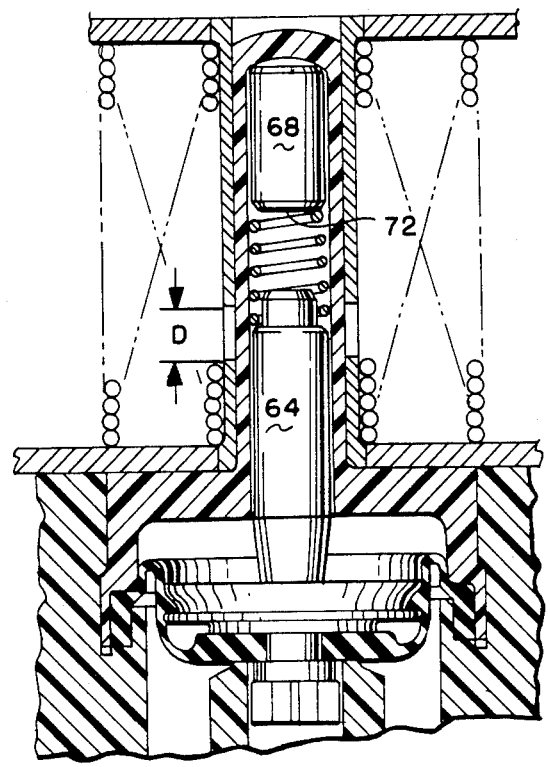
FIG. 4 is a view similar to FIG. 2 illustrating an alternate embodiment of the armature and pole piece.

Referring now to FIG. 1, a dual coil valve indicated generally at 10 is shown as having a pair of valve coil assemblies indicated generally at 12 and 14 and hydraulically series connected for controlling water flow to an appliance. The inlet is indicated generally at 16 in FIG. 1 with the outlet indicated generally at 18.

The coil assemblies 12, 14 are adapted for connection to a source of electrical power through electrical connecting terminals indicated respectively at 20, 22. In the presently preferred practice, coil assemblies 12 and 14 are suitable for energization by a direct current source having a voltage in the range 12-24 volts and each of the coil assemblies is rated at 4 watts at 24 volts D.C. However, it will be understood that the coil assemblies 12, 14 may be employed in control systems utilizing alternating current power source having voltages and wattages in excess of the preferred range.

Referring now to FIG. 2, the coil assembly 14 is shown as retained on the valve body or housing 20 by a suitable pole frame, formed of ferromagnetic material, which has a pair of spaced flanges 23 connected for providing a continuous ferromagnetic flux path therebetween. Upper and lower ferromagnetic tubular pole pieces 24, 26 respectively are received respectively in the flanges and are disposed with the ends thereof defining opposite magnetic poles defining an air gap indicated at "D".

The coil assembly 14 has a plurality of turns of suitable electrical conductor 28, preferably magnet wire which terminates in leads (not shown) connected to the electrical terminals 22 (see FIG. 1).

The body means 20 has a main valving chamber 30 which communicates via passage 32 with the valve inlet 16 and defines therein a main valve seat 34, which surrounds an outlet passage 36.

A pressure responsive diaphragm 38, preferably formed of elastomeric material, has a sealing rim 40 provided about the outer periphery thereof and registered in sealing engagement with an annular lips 42 provided in the valving chamber. Diaphragm 38 has the central portion thereof thickened to provide a main valving member 44 for moveably contacting valve seat 34 and is shown in FIG. 2 in solid outline in the closed position contacting seat 34. In the closed position illustrated in FIG. 2, fluid flow between chamber 30 and outlet 36 is prevented by the sealing of main valve member 44 against the seat 34.

With continuing reference to FIG. 2, the valve member 44, comprising the central portion in diaphragm 38, has received therethrough a suitable insert 46 which extends into the outlet passage 36 for sliding engagement with the wall thereof to thus act as a guide for movement of the valve 44. Insert 46 has the outer periphery thereof engaging the surface of the diaphragm at annular rib 47 for sealing thereabout and preventing fluid passage between the insert and the diaphragm about the periphery of the insert.

Diaphragm insert 46 has a pilot passage 48 formed therethrough and terminating at the upper surface of the insert in a pilot valve seat surface 50.

A guide means 52, formed of non-metallic material, has a cylindrical tubular upper section received in the tubular pole pieces 24, 26 with a closed upper end 54 defining therein a guide hollow 56 which communicates with a larger diameter hollow 58 formed in the lower portion of the guide means 52. The lower portion of guide means 52 has the outer periphery thereof formed in an annular lip 60 which is received over the outer rim 40 of the diaphragm in fluid pressure sealing engagement and cooperates with a bore 62 provided in the body means 80 for positioning the diaphragm therein.

The guide means 52 is thus disposed such that in cooperation with diaphragm 38, the upper and lower guide means hollow portions 56, 58 define a fluid pressure control chamber necessary for proper function and operation of the valve as will be hereinafter described.

With reference to FIG. 2, an armature means is received within the upper guide hollow 56 and includes a generally cylindrical member 64 formed of ferromagnetic material and slideably disposed in the guide hollow 56 for movement therein. The lower portion of armature member 64 has received therein a pilot valving member 66 preferably formed of suitable elastomeric material for valving contact with pilot valve seat 50. In FIG. 2, the armature is shown in the downward limit position of its movement in the closed position with pilot valve member 66 contacting pilot valve seat 50 for preventing fluid flow from the control chamber through passage 48.

The upper end of the armature member 64 preferably has a reduced diameter stepped portion thereon. The upper end of the larger diameter portion of the armature member 64 is disposed generally axially in the middle of the air gap denoted by "D".

An auxiliary pole piece means 68 is slideably received in the upper guide hollow 56 and is formed of suitable ferromagnetic material. The auxiliary pole piece 68 has registered thereagainst the upper end of a suitable spring means 70, which has the lower end thereof received over the smaller diameter portion of the armature 64. The spring 70 biases the auxiliary pole piece 68 upwardly into contact with the closed end portion 54 of the guide. The lower end of the spring urges armature member 64 downwardly to thereby cause pilot valve member 66 to be seated on pilot valve seat 50. The arrangement of the auxiliary pole piece 68 within the guide member 52 permits assembly of the auxiliary pole piece, spring and armature into the guide hollow 56 and subsequent assembly of the diaphragm into the lip 60 as a subassembly to provide ease of installation into the body means 20.

In the presently preferred practice of the invention the auxiliary pole piece 68 is located so as to be remote from the pole piece air gap "D" such that upon flow of electrical current in conductor 28, the concentration of magnetic flux at air gap "D" causes a sufficient magnetomotive force on armature member 64 and results in upward movement of the armature. In the present practice of the invention, a ten percent increase in magnetomotive force has been readily obtained. Upon the armature moving upward in response to magnetomotive force, the upward limit of travel of the armature is provided by the upper end of the armature member 64 contacting the auxiliary pole piece 68 and results in a strong magnetic attraction therebetween and tends to reduce oscillation. Once the armature member 64 contact the auxiliary pole piece 68, the voltage applied to the coil may be significantly reduced without causing loss of magnetomotive attraction between the auxiliary pole piece 68 and the armature 64. Thus the "hold-in" voltage for maintaining the aramture in the fully open position is substantially less than the rated or service voltage applied to the coil for initial actuation.

Referring now to FIG. 3. The control pressure chamber is initially supplied through bleed holes 72, 74 provided respectively in the valve member 44 and the insert 46. The bleed holes are sized so as to provide pressurization of the control chamber initially from the fluid inlet. Upon opening of the pilot valve passage 48 fluid flows to the outlet from the control pressure chamber reducing the pressure therein and causing the pressure in valving chamber 30 to lift the diaphragm and main member 44 upwardly to open the valve to the position shown in FIG. 3.

In the presently preferred practice of the invention, the arrangement of the electromagnetic valve shown in FIGS. 2 and 3 employing auxiliary pole piece 68 permits the air gap "D" to be reduced to a value approximately 80% of that of the gap required to provide the required armature travel as compared with a valve construction not employing the auxiliary pole piece means 68 of the present invention. The resulting arrangement of the present invention provides an electromagnetically actuated valve which will open at a voltage of about 60% of that required for opening of a corresponding valve not employing the present invention. In the presently preferred practice of the invention, for a 24 volt fullwave rectified D.C. supply, the valve is operable with the air gap "D" having a value of 0.180 inches (4.6 millimeters).

The valve of the present invention in the preferred practice has the ratio of the mass of the auxiliary pole piece means 68 to the mass of armature member 64 chosen in the range 45–50%. With this arrangement a valve operable for actuation on a direct current supply at 24 volts will maintain the armature in the fully open position as shown in FIG. 3 when the supply voltage is dropped to a level of 10 volts; and, will maintain the armature in such position until the voltage falls below the 10 volt level.

Referring now to FIG. 4, another embodiment of the invention is illustrated in which a non-magnetic disc or thin-plate member 72 is disposed between auxiliary pole piece 68 and armature 64. The disc 72 is formed of non-magnetic material, preferably stainless steel, and serves to reduce to a negligible value the effects of residual magnetism in the auxiliary pole piece and armature which could cause the armature to be captured in the open position when the coil is de-energized. The disc 72 is generally thin with respect to its diameter, having in the preferred practice a thickness on the order of three percent of the diameter thereof.

The valve of the present invention thus employs the unique electromagnetic actuation means having a stationary auxiliary pole piece means disposed within the sealed control pressure chamber for enabling actuation of the pilot valve at a lower voltage and making contact with the armature for holdings of the pilot valve in the open position at a substantially reduced voltage level.

The present invention provides an electrically energized, pilot operated valve assembly which is suitable for lower power energization by a low voltage power supply. The valve of the present invention employs a stationary auxiliary pole piece means within the fluid pressure control chamber for concentrating therein electromagnetic flux to make contact with and hold the armature in the fully open position despite reduced levels of voltage in the power supply. The present invention provides an electrically actuated pilot operated low power valve particularly suitable for application in appliances such as domestic washing machines.

Although the invention has hereinabove been described with respect to the preferred practice, it will be understood by those skilled in the art, that the invention is capable of modification and variation and is limited only by the following claims.

What is claimed:

1. An electrically energized pilot operated fluid flow valve assembly comprising:
   (a) a coil of electrically conductive material;
   (b) a pair of tubular pole pieces formed of ferromagnetic material received centrally within said coil, said pole pieces disposed in axially spaced arrangement to define therebetween an air gap;
   (c) armature guide means, formed of non-metallic material received within said tubular pole pieces and defining therein a fluid pressure sealing hollow with one end closed and disposed adjacent an end of said tubular pole pieces remote from said air gap, with the opposite end of said armature guide means defining an open end with the periphery thereof enlarged from the diameter of said tubular pole pieces;
   (d) diaphragm means sealed about the said enlarged periphery of said armature guide means to form in cooperation therewith a fluid sealing chamber within said armature guide means, said diaphragm means including means defining a pilot flow passage therethrough communicating with said chamber and a pilot valve seat for said passage disposed within said chamber;
   (e) auxiliary stationary pole piece means slidably disposed within said guide pressure sealing hollow and registered against said closed end thereof;
   (f) armature means including a member of ferromagnetic material moveably received in said guide for axial movement with respect to said air gap, said armature means having one end disposed for contacting said auxiliary pole piece and the opposite end including means defining a pilot valve for sealing against said pilot valve seat;
   (g) spring means having one reacting surface thereof contacting said auxiliary pole piece and the opposite reacting surface thereof contacting said armature means for biasing said auxiliary pole piece and said armature means in opposite directions, wherein said pole piece is urged against said closed end of said guide and said pilot valve is urged against said pilot valve seat;
   (h) means defining a main valving surface on said diaphragm portions thereof external to said chamber;
   (i) housing means defining a valve inlet passage and having said coil and guide received thereon, said housing means defining a main valve seat disposed for sealing contact with said main valving surface and communicating with a valve outlet passage; and
   (j) means defining a bleed passage connecting said inlet passage and said chamber continuously for limited fluid communication therebetween.

2. The valve assembly defined in claim 1, wherein, said auxiliary pole piece and said armature means each have an annular shoulder thereon, with respectively one reacting surface of said spring means registered thereagainst.

3. The valve assembly defined in claim 1, wherein, said auxiliary pole piece has an axial length substantially less than the length of said armature means.

4. The valve assembly defined in claim 1, wherein said tubular pole pieces are disposed to position said air gap adjacent one end of said armature means and said spring means in the valve de-energized condition, biases said armature means to a position spaced from said auxiliary pole piece means.

5. The valve assembly defined in claim 1, wherein the ratio of mass of the pole piece means to the armature means is in the range 45–50% whereby the voltage required to hold said armature means in the fully actuated position comprises about 40% of the rated or applied service voltage of said coil.

6. An electrically energized pilot operated fluid flow valve assembly comprising:

(a) body means defining an inlet passage adapted for receiving fluid flow therein, an outlet passage for discharging fluid flow and a main valve seat disposed in the flow path between said inlet and outlet;

(b) pressure responsive means, including a main valve member moveable in response to differential pressure between a closed position contacting said valve seat for blocking flow to said outlet passage and an open position permitting full flow to said outlet passage;

(c) guide means received on said body means including a member formed of non-metallic material defining a closed end hollow and defining, in cooperation with said pressure responsive means, a fluid pressure control chamber;

(d) said pressure responsive means including means defining a pilot flow passage communicating said control pressure chamber with said outlet passage and a pilot passage seat disposed in the flow path of said pilot passage;

(e) armature means including a member formed of ferromagnetic material slideably received in said guide means hollow and having a pilot valving surface, said armature means movable between a closed position in which said pilot valving surface contacts said pilot valve seat for blocking flow through said pilot passage and an open position in which flow is permitted through said pilot passage;

(f) an auxiliary stationary pole piece including a member formed of ferromagnetic material slidably received in said hollow and disposed at the closed end thereof;

(g) tubular pole piece means including a first and second generally tubular member formed of ferromagnetic material and disposed about said guide hollow, said tubular members defining axially opposite magnetic poles and an air gap therebetween, said air gap located addjacent the end of said armature means remote from said pilot valve seat and said air gap remote from said auxiliary pole piece means;

(i) spring means disposed in said guide hollow biasing said auxiliary pole piece means and said armature means away from each other;

(j) means defining a bleed passage operative for providing limited fluid pressure communication between said inlet passage and said control pressure chamber; and, (k) means defining a coil of electrical conductor received over said tubular pole pieces, said coil, upon application of service voltage thereto and flow of electrical current therethrough operable to generate magnetomotive forces in said tubular pole pieces and said auxiliary pole piece means sufficient to move said armature means from the closed to the open position, wherein said armature means contacts said auxiliary pole piece means and thereafter upon decay of said service voltage to levels below said service voltage, but not less than 40% thereof, said current flow in said coil generates sufficient magnetomotive force in said pole pieces to maintain said armature means in contact with said auxiliary pole piece means.

* * * * *